United States Patent [19]

Weeden

[11] Patent Number: 5,159,873
[45] Date of Patent: Nov. 3, 1992

[54] HOT BEVERAGE PRODUCING DEVICE

[76] Inventor: Kim Weeden, 9441 Crenshaw Blvd., Inglewood, Calif. 90305

[21] Appl. No.: 659,893

[22] Filed: Feb. 25, 1991

[51] Int. Cl.$^5$ .............................................. A47J 31/00
[52] U.S. Cl. ........................................ 99/279; 99/295; 99/305
[58] Field of Search .................. 99/279, 280, 283, 290, 99/291, 295, 298, 299, 300, 302 R, 304, 305, 306, 307, 316; 426/433

[56] References Cited

U.S. PATENT DOCUMENTS

| | | | |
|---|---|---|---|
| 2,809,577 | 10/1957 | Sill | 99/290 |
| 3,371,593 | 3/1968 | Price | 99/283 |
| 3,463,075 | 8/1969 | Wickenberg | 99/304 |
| 3,650,201 | 3/1972 | Jovanovic | 99/279 |
| 4,790,239 | 12/1988 | Hewitt | 99/279 |
| 4,875,408 | 10/1989 | McGee | 99/283 |

FOREIGN PATENT DOCUMENTS

| | | | |
|---|---|---|---|
| 2219602 | 10/1973 | Fed. Rep. of Germany | 99/279 |
| 2410620 | 9/1975 | Fed. Rep. of Germany | 99/280 |

Primary Examiner—Harvey C. Hornsby
Assistant Examiner—Reginald L. Alexander
Attorney, Agent, or Firm—Robert J. Schaap

[57] ABSTRACT

A beverage producing device which can be connected to and transported in the passenger compartment of a vehicle and more particularly, in the cab of a truck. The beverage producing device is operable from the power source of the truck or other vehicle. This beverage producing device comprises a canister having an interior reservoir or compartment for receiving hot water with a heating core located within the reservoir. A second compartment is located in vertically spaced relationship to the first compartment. A filter may be located at one of the compartments and contains a substance capable of producing the beverage such as for example, coffee grounds, tea leaves or the like. Water passing through the substance produces a beverage which can then be introduced into a cup capable of being disposed immediately beneath an outlet on the device.

4 Claims, 2 Drawing Sheets

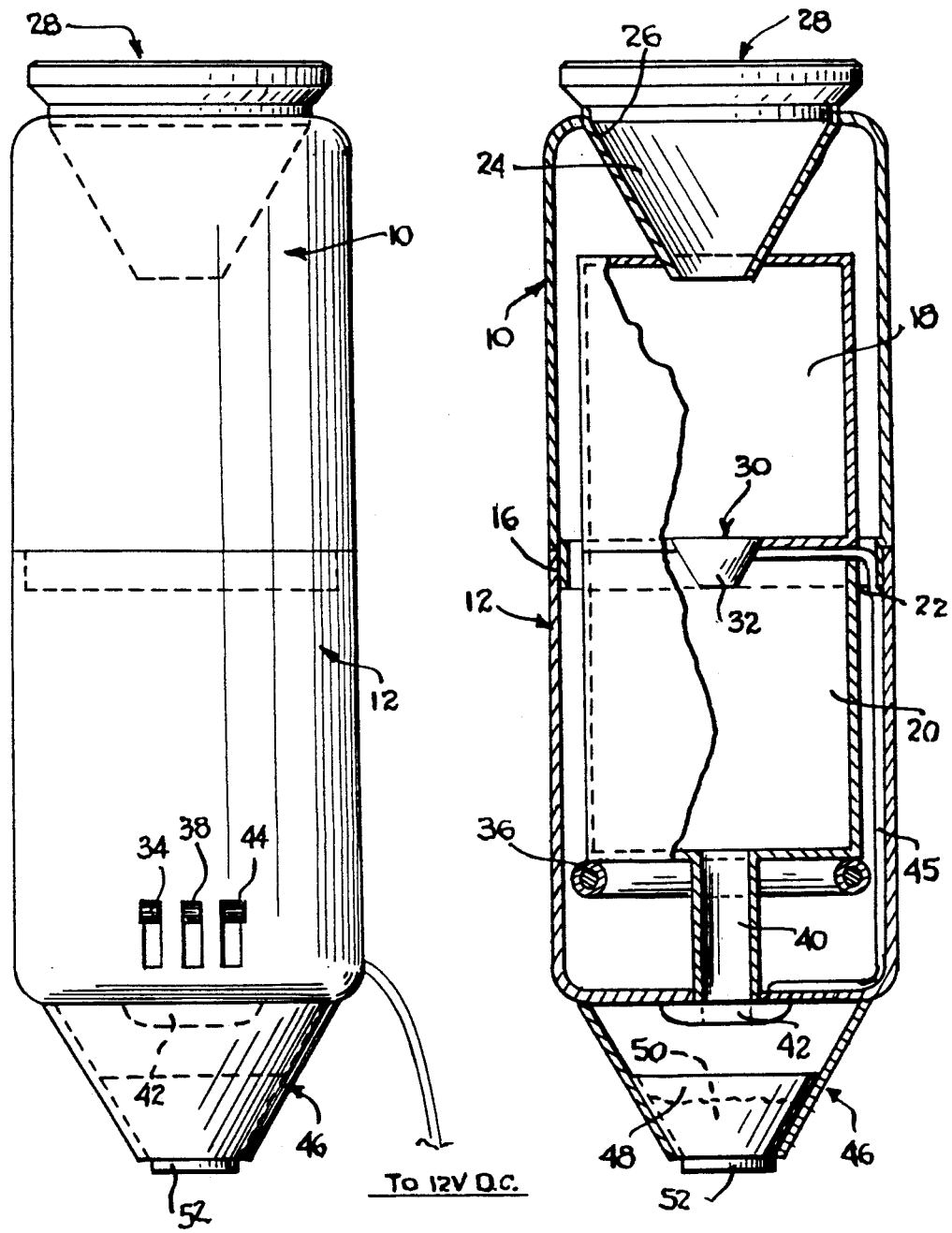

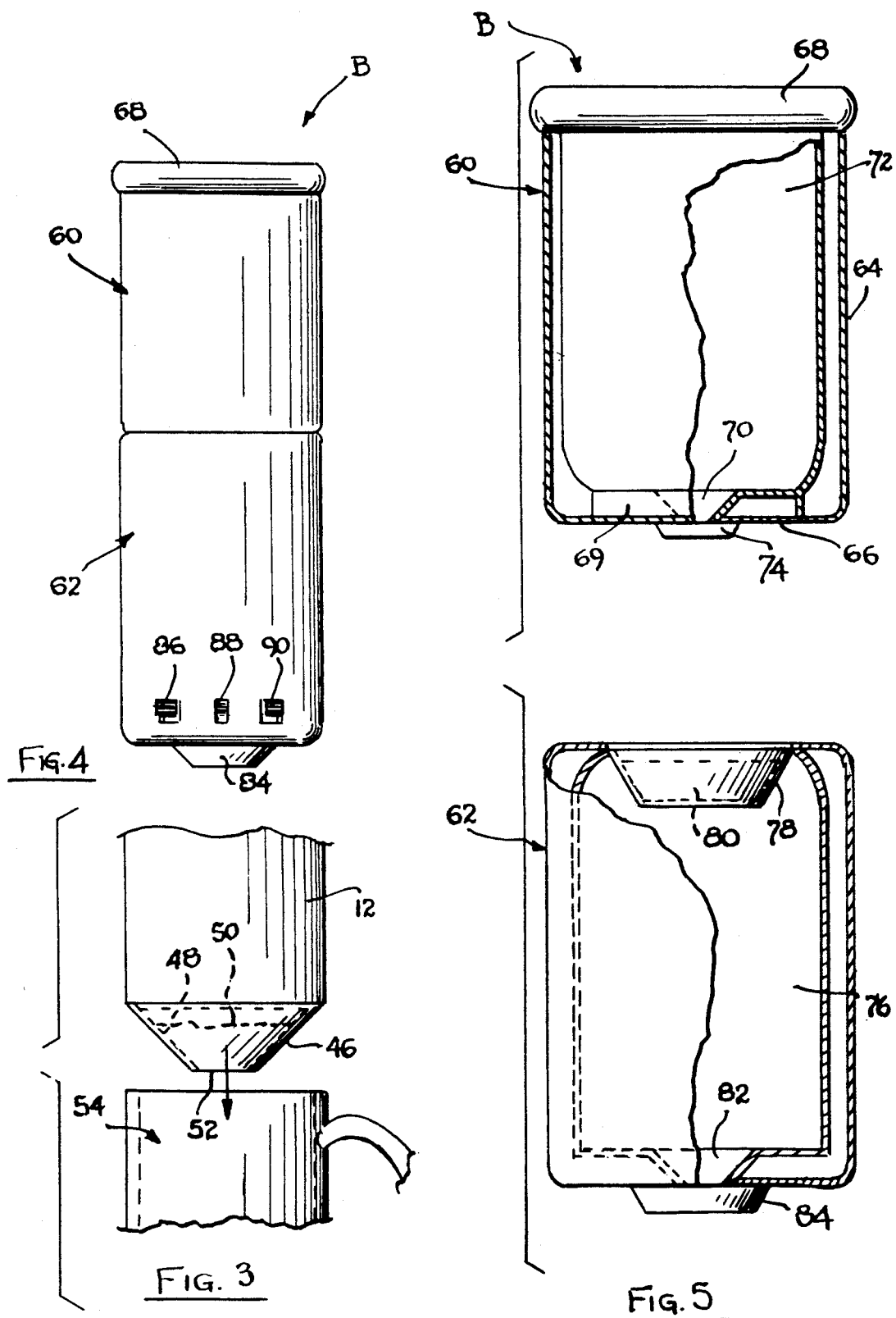

HOT BEVERAGE PRODUCING DEVICE

BACKGROUND OF THE INVENTION

1. Field of the Invention

This invention relates in general to certain new and useful improvements in a hot beverage producing device for use in automotive vehicles, and more particularly to a hot beverage producing device which uses a pair of separate liquid containing compartments to enable preparation of a fresh beverage at the time of use.

2. Brief Description of the Prior Art

Parties who frequently travel in automotive vehicles, and especially truck drivers and the like often desire periodic cups of a beverage for purposes of refreshment. In many cases, drivers who are forced to drive long distances often rely upon beverages, such as coffee or tea, for purposes of caffeine intake in order to maintain stimulation to overcome periods of drowsiness.

One very common technique which is used by a large number of drivers is to maintain a thermos bottle containing a hot beverage. The disadvantage of this arrangement is that after a period of time, unless the thermos bottle is very efficient, the beverage cools. More importantly, after a period of time, the beverage, and particularly coffee, will begin to develop a very sour and unpalatable taste. Thus, many truckers and other long-distance drivers prefer the advantages of a freshly prepared beverage, such as a freshly prepared cup of coffee or tea.

Another of the disadvantages of thermos bottles is the fact that they are difficult to manipulate while driving. The truck driver or other individual must attempt, with one hand, to position a coffee cup and possibly hold the same with his knees and then remove the top of the thermos bottle and pour the contents into a coffee cup. Not only does this result in an inherent danger while driving, but the driver often pours some of the contents on himself or herself. If the beverage is hot, this can result in serious accidents if not burns, not to mention the stains on the seats of the vehicle and the clothing of the individual.

There have been several proposed coffee makers and like beverage producing devices for use in automotive vehicles For example, U.S. Pat. No. 3,955,713 to Hurley discloses a rather complex beverage producing device which utilizes a plurality of compartments. U.S. Pat. No. 4,055,279 to Lapera et al. also discloses a hot beverage producing device for use in an automotive vehicle. The devices in each of these two patents are quite complex and very expensive to produce. Moreover, they are very large and bulky and not effective for use in automotive vehicles.

U.S. Pat. No. 2,989,093 to Stiebel also discloses a hot beverage preparation device. While this device does not have the complexity of the devices of the Lapera and Hurley patents, it is also difficult to use and not very effective. More importantly, it is quite large in size.

U.S. Pat. No. 3,189,728 to Schneider also discloses a beverage making device but which is not effective for use in automotive vehicles. The same holds true of a portable heating device in U.S. Pat. No. 3,467,816 to Wahlberg. A similar beverage making device, which is not effective for use in a vehicle, is that illustrated in U.S. Design Pat. No. DES. 89,364.

Inasmuch as the commercially available and proposed hot beverage producing devices are not entirely effective, many long-distance drivers have had to make frequent stops at coffee shops and/or road-side cafes and the like. However, this is undesirable inasmuch as it interferes with driving time, particularly for employees who are paid for long distance drives.

OBJECTS OF THE INVENTION

It is, therefore, one of the primary objects of the present invention to provide a hot beverage producing device which utilizes a pair of separated compartments, such that a beverage can be formed using a liquid in one compartment and a liquid can be stored in another compartment.

It is another object of the present invention to provide a hot beverage producing device of the type stated that is highly effective for use with automotive vehicles and is adapted for connection to the power source of the vehicle.

It is a further object of the present invention to provide a hot beverage producing device of the type stated which can be constructed at a relatively low cost and which utilizes only a small amount of space in the cab in the driver compartment of an automotive vehicle.

It is yet another object of the present invention to provide a hot beverage producing device of the type stated which is easy to manipulate and in which a beverage can be produced and dispensed utilizing manipulation with only one hand.

With the above and other objects in view, my invention resides in the novel features of form, construction, arrangement and combination of parts presently described and pointed out in the claims.

BRIEF SUMMARY OF THE INVENTION

A hot beverage preparation apparatus for use in engine powered vehicles having a relatively small number of passengers. This type of automotive vehicle will typically adopt the form of a passenger vehicle, the cab of a truck, small boats, airplanes and the like.

The hot beverage preparation device comprises a first liquid retaining compartment for holding a liquid, such as water, along with a separate liquid retaining compartment located in vertically spaced relationship with and beneath the first compartment for retaining a hot liquid therein. A filter is associated with one of the compartments so that a liquid can percolate through beverage substance in a filter disposed in a filter housing. In this way, a liquid beverage can be formed.

The hot beverage preparation device also comprises a heating element and preferably an electrically operable heating element. This heating element is associated with one of the compartments for heating a liquid therein to a temperature sufficient to produce a beverage. The hot beverage preparation device will also comprise a valve means which is openable for permitting withdrawal of the liquid beverage in one of the liquid retaining compartments.

In a more preferred embodiment, the filter housing which retains the filter and the grounds is located intermediate the first and second liquid retaining compartments. In another embodiment, the filter housing is located at the lower end of the second liquid retaining compartment.

The filter housing is preferably funnel shaped and the filter located therein is a removable filter. In addition, a drinking container such as a cup is capable of being located beneath the valve means to receive a discharged liquid beverage.

The first and second liquid retaining compartments are vertically arranged and the valve means is located at the end of the second liquid retaining compartment. In one embodiment, the valve means is an electrically operable valve means and in another embodiment the valve means is a mechanically operable valve means. The beverage dispensing device is electrically operated, as aforesaid. For this purpose, a first switch means is provided for controlling the heating element. A second switch means is provided for opening the valve when the latter is electrically operable, to permit a discharged liquid beverage into the second liquid retaining compartment.

This invention possesses many other advantages and has other purposes which will be made more clearly apparent from a consideration of the forms in which it may be embodied. At least one of these forms is described in the following detailed description of the invention. However, it should be understood that the detailed description is set forth only for purposes of illustrating the general principles of the invention, and is not to be taken in a limiting sense.

BRIEF DESCRIPTION OF THE DRAWINGS

Having thus described the invention in general terms, reference will now be made to the accompanying drawings in which:

FIG. 1 is a side elevational view of a beverage producing device constructed in accordance with an embodiment of the present invention;

FIG. 2 is a vertical sectional view showing a portion of the beverage producing device in FIG. 1;

FIG. 3 is an enlarged side elevational view showing the lower end of the beverage producing device in relationship to a receptacle for receiving the beverage therein;

FIG. 4 is a side elevational view of a modified form of beverage producing device; and FIG. 5 is a vertical sectional view showing portions of the beverage producing device of FIG. 4.

DETAILED DESCRIPTION OF PRACTICAL EMBODIMENTS

Referring now in more detail and by reference characters to the drawings which illustrate preferred embodiments of the present invention, A designates a hot beverage preparation device which is comprised of an upper housing section 10 and a lower housing section 12 and which are capable of being secured together.

In the embodiment as illustrated, the upper housing 10 is provided with a downwardly struck flange 14 capable of being threadedly engaged with an annular groove 16 formed around the upper end of the lower housing 12. The upper housing 10 is provided with an interior compartment 18 and separated from a similar compartment 20 in the lower housing section 12 by means of a bottom wall 22 which extends across the upper housing 10.

The upper housing 10 is also provided with a funnel shaped opening 24 having an inlet or so-called "mouth" 26. Moreover, a removable cap 28 may be threadedly secured over the mouth 26. Any other type of securement means for holding the cap 28 over the mouth 26 may also be employed. In a preferred embodiment, water is typically introduced into the compartment 18. This water may adopt a form of cold water.

The bottom wall 22 is provided with a discharge port 30 and extending over the discharge port 30 is a valve 32 which leads into the compartment 20. The valve 32 may be controlled by the operator of the apparatus and is preferably an electrically operable valve. However, the valve 32 may adopt the form of a mechanically operable valve. In this case, in the latter embodiment, an arm would extend outwardly from the housing for manual actuation by the user of the apparatus in order to open and close the valve. In the embodiment where the valve 32 is electrically operable, it is preferably a solenoid operated valve. In this case, a manually actuable switch 34 is provided on the exterior of the housing for purposes of opening and closing the valve 32.

Located within the compartment 20 is a heater core 36 which is again an electrically operable heating core. In this case, the core 36 will contain an electrically resistive element for purposes of generating heat. The heater core is operable by the operator through a second switch 38 on the housing, in the manner as illustrated in FIGS. 1 and 2. The liquid, such as water, in the compartment 20, after being heated, can pass through a discharge port 40 formed in the lower end of the lower housing 12. The discharge of the liquid in the compartment 20 is again controlled by a discharge valve 42 over the lower end of the discharge port 40, also as best illustrated in FIG. 2.

The valve 42 is again, preferably, an electrically operable valve such as a solenoid valve, although it may be a mechanically actuable valve, as previously described. In the embodiment of the invention where the valve 42 is an electrically operable valve, it is controllable by means of a switch 44 also located on the exterior of the lower housing 12.

It can be understood that the electrically operable valve 32 and the heater core 36 and the valve 42 would be connected to the switches 34, 38 and 44, respectively through electrical conductors 45. These conductors could be run through the body of the housings. Otherwise, suitable insulated strips running along the interior of the wall of the compartments could be employed. An exterior connector (not shown) would also be provided for connection to the power source of the vehicle. This can typically be accomplished employing the cigarette lighter compartment by using a plug capable of insertion into the cigarette lighter receptacle of the vehicle.

Located beneath the lower housing 12 is a filter housing 46 which is in the form of a funnel-shaped member. This housing 46 is suitably designed and shaped to contain a removable filter, such as a paper filter 48. The filter 48 is designed to contain a suitable substance 50 such as coffee grounds, tea leaves or the like. At the lower end of the filter housing 46 there is provided a discharge opening 52 so that any beverage formed in the apparatus can be discharged into a cup 54 located beneath the filter housing 46.

It can be observed, in accordance with the embodiment of the device A, that water may be introduced into the upper compartment 18 and retained therein generally in an unheated state. Water can also be introduced into the compartment 20. When the user of the apparatus desires to produce a cup of a beverage, he can operate the heater element in order to heat the water in the compartment 20. Thereafter, and after the water has heated, the user, by actuation of the switch 44, can cause the water to discharge from the compartment 20, through the filter 48 and the substance 50 and into the cup 54.

It can be observed there has been no beverage produced until the user actually heats the water in the compartment 20 and causes the same to pour through the substance 50 in the filter 48. In addition, there is provided a second compartment 18 in which water could also be used to form a second cup of the beverage. At the option of the user, actuation of the switch 34 will cause opening of the valve 32 and permit the contents in the compartment 18 to drain into the compartment 20. In this way, the same process may be repeated so that a second cup of a fresh beverage can be prepared.

It can be observed, that in accordance with this embodiment of the invention, the user may selectively prepare a single cup of a beverage and drink that cup. It is not necessary to utilize all of the water in the apparatus to prepare that beverage at one point in time. When the user desires a second cup of the beverage, it is only necessary again to repeat the process of operating the heating core 36 and permitting discharge of the heated liquid through the substance 50. In addition, this apparatus A is also highly effective in that it only consumes a small amount of space, approximately the amount of space necessary for a thermos bottle.

FIGS. 4 and 5 illustrate another embodiment of a beverage preparation device B constructed in accordance with and embodying the present invention. The apparatus B s similar to the apparatus A and also comprises an upper housing 60 vertically disposed over a lower housing 62. At its lower end, the upper housing 60 is also provided with a cylindrically shaped side wall 64 and having a bottom wall 66 and a removable cap 68 at its upper end. The bottom wall 66 is provided with a cylindrically shaped heating element 69. In this case, the heating element 69 is located in the upper housing 60, as opposed to the lower housing 62. The heating core 69 is cylindrically shaped and provided in its interior portion with a discharge openinq 70 communicating with an interior compartment 72. A discharge valve 74 covers the discharge opening 70. The valve 74 is similar to the previously described valves 32 and 42 and may be either mechanically operable or electrically operable.

The lower housing 62 is also provided with an interior compartment 76. Moreover, at its upper end the housing 62 is provided with a removable filter housing 78 containing a removable filter element 80, the latter capable of retaining a beverage producing substance similar to those previously described. In this case, liquid such as water in the compartment 72 would pass through the discharge opening 70 when the valve 74 is opened. The liquid will pass through the substance in the filter 80 and into the compartment 76. The compartment 76 has no active heating element and may be provided with a heating element at its lower end, if desired. However, the compartment 76 serves primarily as a holding compartment. At its lower end, the compartment 76 is provided with a discharge opening 82 covered by a control valve 84. Here again, the valve 84 may be electrically operable or mechanically operable, as previously described.

The lower housing 62 may similarly be provided with a first switch 86 controlling the valve 74, a switch 88 controlling the heater core 69 and a switch 90 controlling the valve 84.

In accordance with the embodiment B, as illustrated in FIGS. 4 and 5, it can be seen that water may be kept in the upper compartment 72. After water passes through the filter, it will become a beverage and held in the compartment 76 until used. At that point, the valve 84 may be opened permitting discharge into a cup or similar container.

Thus, there has been illustrated and described a unique and novel hot beverage preparation device and which is highly effective for use in automotive vehicles and the like. This beverage preparation device thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by Letters Patent is:

1. A hot beverage preparation apparatus for use in and located into the passenger compartments of engine powered vehicles having a relatively small number of passengers, said apparatus comprising:
   a) an outer housing having a lower end thereof,
   b) a first liquid retaining compartment or holding a liquid such as water,
   c) a second liquid retaining compartment located in vertically spaced relationship with and beneath said first compartment of retaining a hot liquid therein,
   d) a filter housing associated with one of said compartments so that a liquid can drain through a beverage producing substance in a filter disposed in said filter housing to form a liquid beverage,
   e) an electrically operable heating element associated with one of said compartments for heating the liquid therein to a temperature sufficient to form a beverage, said heating element being operable from the electrical power provided by the electrical system of the vehicle,
   f) a first electrically operable valve means in said outer housing and which is operable for permitting discharge of a liquid from the first liquid retaining compartment to the second liquid retaining compartment,
   g) a second electrically operable valve means in said housing and which is operable for permitting discharge of a liquid beverage from the second liquid retaining compartment outwardly with apparatus for collection in a beverage cup,
   h) first manually actuable switch means for controlling the heating element, said heating element being operable from the electrical power provided by the electrical system of the vehicle,
   i) second manually actuable switch means for operating said second valve means and enabling discharge of the liquid beverage in the second liquid retaining compartment,
   j) third manually actuable switch means for operating said first valve means or enabling discharge of the liquid in the first liquid retaining compartment to the second liquid retaining compartment, and
   k) supporting means for supporting the outer housing of the apparatus in the engine powered vehicle in a position where a beverage cup can be located beneath the apparatus for receiving a hot beverage from the lower end of the apparatus, and here the manually actuable heating element control means and the valve means can be actuated by a single hand of a user of the apparatus.

2. The to beverage preparation apparatus of claim 1 further characterized in that the filter housing is located intermediate the first and second liquid retaining compartments.

3. A hot beverage preparation apparatus for use in and located in the passenger compartments of engine lowered vehicles having a relatively small number of passengers, said apparatus comprising:
   a) an outer housing having a lower end thereof,
   b) a first liquid retaining compartment for holding a liquid such as water,
   c) a second liquid retaining compartment located in vertically spaced relationship with and beneath said first compartment for retaining a to liquid therein;
   d) a funnel-shaped filter housing associated with one of said compartments so that a liquid can drain through a beverage producing substance in a removable filter disposed in said filter housing to form a liquid beverage,
   e) an electrically operable heating element associated with one of said compartments for heating the liquid therein to a temperature sufficient to form a beverage, said heating element being operable from the electrical power provided by the electrical system of the vehicle,
   f) a first electrically operable valve means in said outer housing and which is operable for permitting discharge of a liquid from the first liquid retaining compartment to the second liquid retaining compartment,
   g) a second electrically operable valve means in said housing and which is operable for permitting discharge of a liquid beverage from the second liquid retaining compartment outwardly with apparatus for collection in a beverage drinking container,
   h) first manually actuable switch means for controlling the heating element, said heating element being operable from the electrical power provided by the electrical system of the vehicle,
   i) second manually actuable switch means for operating said second valve means and enabling discharge of the liquid beverage in the second liquid retaining compartment,
   j) third manually actuable switch means for operating said first valve means for enabling discharge of the liquid in the first liquid retaining compartment to the second liquid retaining compartment, and
   k) supporting mean of supporting the outer housing of the apparatus in the engine powered vehicle in a position where a beverage drinking container can be located beneath the second valve mean for receiving a hot beverage discharged from the lower end of the apparatus, and where the manually actuable heating element control means and the valve means can be actuated by a single hand of a user of the apparatus.

4. A hot beverage preparation apparatus for use in and located in the passenger compartments, of engine powered vehicles having a relatively small number of passengers, said apparatus comprising:
   a) an outer housing having a lower end thereof,
   b) a first liquid retaining compartment for holding a liquid such as water,
   c) a second liquid retaining compartment located in vertically spaced relationship with and beneath said first compartment for retaining a hot liquid therein,
   d) a filer housing associated with one of said compartments so that a liquid can drain through a beverage producing substance in a filer disposed in said filter housing to form a liquid beverage,
   e) an electrically operable heating element associated with one of said compartments for heating the liquid therein to a temperature sufficient to form a beverage, said heating element being operable from the electrical power provided by the electrical system of the vehicle,
   f) a first electronically operable valve means in said outer housing and which is operable for permitting discharge of a liquid from the first liquid retaining compartment to the second liquid retaining compartment,
   g) a second electrically operable valve means in said housing located at the lower end of said second liquid retaining compartment and which is operable for permitting discharge of a liquid beverage from the second liquid retaining compartment outwardly with apparatus for collection in a beverage cup,
   h) first manually actuable switch means for controlling the heating element, said heating element being operable from the electrical power provided by the electrical system o the vehicle,
   i) second manually actuable switch means for operating said second valve means and enabling discharge o the liquid beverage in the second liquid retaining compartment,
   j) third manually actuable switch means for operating said first valve means for enabling discharge of the liquid in the first liquid retaining compartment to the second liquid retaining compartment, and
   k) supporting means for supporting the outer housing of the apparatus int eh engine powered vehicle in a position where a beverage cup can be located beneath the apparatus for receiving a hot beverage from the lower end of the apparatus, and where the manually actuable heating element control means and the valve means can be actuated by a single hand of a user of the apparatus.

* * * * *